United States Patent [19]

Estelle

[11] Patent Number: 5,381,269
[45] Date of Patent: Jan. 10, 1995

[54] ZOOM LENS

[75] Inventor: Lee R. Estelle, Rochester, N.Y.

[73] Assignee: Eastman Kodak Company, Rochester, N.Y.

[21] Appl. No.: 40,231

[22] Filed: Mar. 30, 1993

[51] Int. Cl.⁶ .................................................. G02B 15/14
[52] U.S. Cl. ...................................... 359/691; 359/676; 359/683; 359/716
[58] Field of Search ............... 359/691, 676, 683, 708, 359/716

[56] References Cited

U.S. PATENT DOCUMENTS

| | | | |
|---|---|---|---|
| 4,009,928 | 3/1977 | Back | 359/676 X |
| 4,074,931 | 2/1978 | Okudaira | 350/184 |
| 4,118,108 | 10/1978 | Muszumanski | 350/184 |
| 4,195,912 | 4/1980 | Doi et al. | 350/184 |
| 4,400,064 | 8/1983 | Ikemori et al. | 350/426 |
| 4,560,253 | 12/1985 | Ogino | 350/426 |
| 4,976,522 | 12/1990 | Igarashi | 350/426 |
| 4,993,814 | 2/1991 | Hata | 350/426 |
| 4,999,007 | 3/1991 | Aoki et al. | 350/426 |
| 5,124,836 | 6/1992 | Kikuchi | 359/422 |
| 5,153,777 | 10/1992 | Okada et al. | 359/692 |
| 5,155,629 | 10/1992 | Ito et al. | 359/676 |

FOREIGN PATENT DOCUMENTS 4-46308A 2/1992 Japan .
4-46309A 2/1992 Japan .
4-46310A 2/1992 Japan .

Primary Examiner—Scott J. Sugarman
Attorney, Agent, or Firm—Svetlana Z. Short

[57] ABSTRACT

A compact 2X zoom lens system consisting of a small number of lens elements. The zoom lens system consists of two lens groups, a first lens unit having a negative refractive power and a rear lens unit of positive refractive power. Both lens units are movable on an optical axis for zooming.

33 Claims, 1 Drawing Sheet

ZOOM LENS

BACKGROUND OF THE INVENTION

1. Field of the Invention

This invention relates to a zoom lens, and more particularly to a zoom lens which is capable of 2X or higher zooming ratio, covers a 65° field and which requires as few as three lens components.

2. Description of Prior Art

Because of the desire to reduce the size, weight and cost of photographic cameras, efforts are being made to reduce the size, weight and cost of the optical systems for use in such cameras, and particularly the taking lens used to expose photographic film or other light-sensitive materials such as for use in 35 mm cameras (135 mm format).

Most two-unit zoom lens systems having a front negative and a rear positive configuration require that the front unit comprise at least one positive and one negative lens component and that a rear lens unit comprise a plurality of lens elements arranged in a triplet or triplet derivative configuration. We define herein a triplet derivative configuration as a configuration of lens elements consisting of a negative power lens component or element situated in an air space and surrounded by two or more positive lens elements. Examples of such configurations are disclosed in U.S. Pat. Nos. 4,993,814, 4,560,253, 4,400,064, 4,195,912, 4,074,931 and 4,118,108. As shown in the prior art, this configuration typically comprises six to eight lens components.

U.S. Pat. No. 4,993,814 also shows a simplification of the above design in that the positive lens element can be eliminated from the front group. The rear group was also simplified into a form of classical triplet, i.e., three air spaced lens element arranged in a plus, minus, plus configuration. The result is a front group consisting of a single negative element and a rear group consisting of only three air spaced elements. U.S. Pat. No. 4,999,007 also shows the above improvement, but in addition discloses an alternative configuration (see FIGS. 6, 7 and 9 of U.S. Pat. No. 4,999,007)—a lens system comprised of at least three lens components arranged into three lens units. The first two units move independently during zooming and each comprises a single lens element. The rear or third unit is stationary. However, further need for lens system simplification still exists.

SUMMARY OF THE INVENTION

An object of the present invention is to provide a compact zoom lens system consisting of a small number of lens elements, having light weight and manufacturable at relatively low costs.

The zoom system according to the present invention consists, in order from the object side, a front lens unit having a negative refractive power, the front lens unit being movable on an optical axis for zooming operation, the front lens unit consisting of one or more negative elements, and a rear lens unit having positive refractive power. The rear lens unit is movable on an optical axis for zooming operation, the rear lens unit comprising a plurality of lens components arranged into two subunits, one of the subunits having a positive optical power, the other of the subunits having negative power.

According to one aspect of the invention, the front subunit of the rear lens unit has a positive optical power and a rear subunit of the rear lens unit has a negative optical power. According to yet another aspect of the present invention, the rear lens subunit is a meniscus lens component.

According to one embodiment of the present invention the front subunit of the rear lens unit is in a cemented doublet. According to another embodiment, the front subunit is a positive power singlet.

DETAILED DESCRIPTION OF THE PREFERRED EMBODIMENTS

Figure 1:
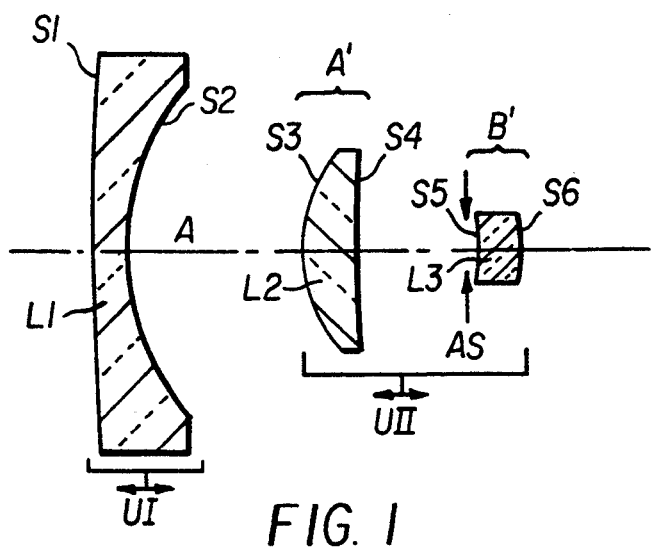
FIG. 1 is a sectional view of a first embodiment of the lens system according to the present invention.

The preferred embodiments of the zoom lens system according to the present invention will be described concretely in the form of numerical data with reference to the accompanying drawings:

Embodiment 1
Table 1

| Surface | Clear Aper. | Radius | Thickness | Glass N | V |
|---|---|---|---|---|---|
| 1 | 27.50 | $r_1 = 234.733$ | $d_1 = 2.50$ | 1.501 | 56.4 |
| 2 | 22.58 | $r_2 = 18.202$ | $d_2 = A$ | | |
| 3 | 13.71 | $r_3 = 11.774$ | $d_3 = 3.87$ | 1.589 | 61.3 |
| 4 | 12.20 | $r_4 = 96.685$ | $d_4 = 7.74$ | | |
| | 3.71 | DIAPHRAGM | | | |
| 5 | 3.67 | $r_5 = -11.609$ | $d_5 = 0.50$ | | |
| 6 | 4.10 | $r_6 = -14.870$ | $d_6 = 3.00$ | 1.805 | 25.4 |

| EF | BF | FF | A | LENS LENGTH | F/NO | DIAPH DIAM | BEST FOCUS |
|---|---|---|---|---|---|---|---|
| 69.99 | 62.72 | 58.58 | 4.491 | 22.101 | 16.0 | 3.71 | −1.67 |
| 47.00 | 46.59 | 25.82 | 12.082 | 29.692 | 12.1 | 3.71 | −1.30 |
| 35.01 | 38.17 | 8.73 | 20.000 | 37.610 | 10.0 | 3.71 | −0.70 |
| 79.98 | 69.73 | 72.82 | 2.553 | 20.163 | 17.7 | 3.71 | −1.77 |

Embodiment 2
Table 2

| Surface | Clear Aper. | Radius | Thickness | Glass N | V |
|---|---|---|---|---|---|
| 1 | 31.90 | $r_1 = 577.968$ | $d_1 = 3.000$ | 1.498 | 67.0 |
| 2 | 26.19 | $r_2 = 19.897$ | $d_2 = A$ | | |

-continued

| | | | | | | |
|---|---|---|---|---|---|---|
| 3 | 19.97 | $r_3 = 14.684$ | $d_3 = 8.102$ | | 1.772 | 49.7 |
| 4 | 16.79 | $r_4 = -49.920$ | $d_4 = 1.500$ | | 1.847 | 23.8 |
| 5 | 14.75 | $r_5 = 127.413$ | $d_5 = 5.937$ | | | |
| 6 | 5.54 | $r_6 = -13.821$ | $d_6 = 3.796$ | | 1.847 | 23.8 |
| 7 | 4.06 | $r_7 = -19.858$ | $d_7 = 0.000$ | | | |
| | 3.96 | DIAPHRAGM | | | | |

| EF | BF | FF | A | LENS LENGTH | F/NO | DIAPH DIAM | BEST FOCUS |
|---|---|---|---|---|---|---|---|
| 79.96 | 63.32 | 78.37 | 2.779 | 25.114 | 16.00 | 3.96 | −1.02 |
| 52.90 | 45.55 | 37.16 | 9.951 | 32.286 | 11.50 | 3.96 | −0.81 |
| 35.01 | 33.81 | 9.92 | 20.777 | 43.112 | 8.54 | 3.96 | −0.48 |

Embodiment 3
Table 3

| Surface | Clear Aper. | Radius | Thickness | Glass N | V |
|---|---|---|---|---|---|
| 1 | 21.10 | $r_1 = 2193.850$ | $d_1 = 3.000$ | 1.498 | 67.0 |
| 2 | 23.37 | $r_2 = 17.160$ | $d_2 = A$ | | |
| 3 | 18.72 | $r_3 = 12.950$ | $d_3 = 7.480$ | 1.772 | 49.7 |
| 4 | 15.91 | $r_4 = -51.994$ | $d_4 = 1.500$ | 1.847 | 23.8 |
| 5 | 13.71 | $r_5 = 77.152$ | $d_5 = 5.430$ | | |
| 6 | 5.33 | $r_6 = $ ASPHERE | $d_6 = 2.924$ | 1.847 | 23.8 |
| 7 | 4.16 | $r_7 = -17.606$ | $d_7 = 0.000$ | | |
| | 4.05 | DIAPHRAGM | | | |

| EF | BF | FF | A | LENS LENGTH | F/NO | DIAPH DIAM | BEST FOCUS |
|---|---|---|---|---|---|---|---|
| 79.87 | 64.72 | 78.45 | 2.766 | 23.100 | 16.00 | 4.05 | −.31 |
| 52.93 | 46.02 | 39.62 | 8.072 | 28.406 | 11.40 | 4.05 | −.61 |
| 35.01 | 33.60 | 13.82 | 16.113 | 36.447 | 8.31 | 4.05 | −.46 |

$$X = \frac{CY^2}{1 + \sqrt{1 - (K+1)C^2Y^2}} + DY^4 + EY^6$$

where:
$C = -.07806828$
$K = .34475$
$D = -0.4711 \times 10^{-4}$
$E = -0.1009 \times 10^{-5}$
VERTEX RADIUS $= -12.8093$ In the above tables, the reference symbols $r_1$, $r_2$, ... represent radii of curvature of the surfaces S1, S2 ... of the respective lens elements L1, L2, L3, L4. The reference symbols $d_1$, $d_2$, ... designate thickness of the respective lens elements and air spaces reserved therebetween, the reference N is an index of refraction and symbol V represents Abbe numbers of the respective lens elements, 1/C is a radius of curvature for the surface and K is a conic constant of the surface, y is a marginal ray height and D and E are aspheric coefficients of the surface.

The zoom lens 100 of Embodiment 1 is illustrated in FIG. 1 and its parameters are provided in Table 1. From an object side, the front lens unit UI of the first embodiment has negative power and consists of a single lens element L1. The lens element L1 is a meniscus lens element and has a front convex surface S1 and a rear concave surface S2. The rear surface S2 has a stronger radius of curvature $r_2$ than the radius of curvature $r_1$ of the front surface S1. The second lens unit UII of the first embodiment comprises two lens subunits. The front subunit A' has positive power and is in the form of a single positive lens component L2. The rear subunit B' has negative power and consists of a single meniscus shape lens component L2 that has a first concave surface facing the front. An aperture stop AS is located adjacent to the rear subunit B' in the air space between the front and the rear subunits and moves with the lens elements comprising subunits A' and B'. The front lens unit UI and the rear unit UII move axially for zooming, whereby the air space A between the two lens units varies during zooming. The rear unit UII, serves as a variator and the front unit UI serves as a compensator during zooming. The effective focal length of this embodiment ranges between 35 and 80 mm. The embodiment covers a half angle of 31.7 to 15.0 degrees and its F/# varies from F/10 to F/17.7.

Figure 2:
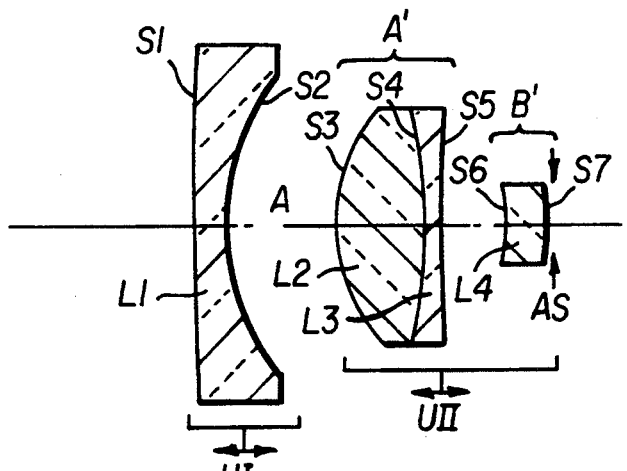
FIG. 2 is a sectional view of a second embodiment of the lens system according to the present invention.

The second embodiment is illustrated in FIG. 2 and its parameters are given in Table 2. As the above described embodiment, it also consists of two lens units UI and UII. As in the above described embodiment, from an object side, the front lens unit UI consists of a single negative lens element L1, while the rear lens unit consists of two subunits A' and B'. The front unit UI is similar in construction to the front unit of the first embodiment; however, the surface S1 of the lens element L1 in this second embodiment is weaker than the surface S1 of lens element L1 of the first embodiment. The front subunit A' of the rear unit UII in the second embodiment comprises two lens elements L2 and L3 cemented together forming a cemented doublet component. The front lens element L2 of the doublet is a positive bi-convex lens element. The second lens element comprising the cemented doublet component is a negative power bi-concave lens element L3. The rear subunit B' comprises a lens component which is a form of a single lens element L4 which has a stronger curved surface facing the front subunit. The aperture stop AS is located adjacent to the rear subunit B' behind the lens component of said rear subunit. Both the front lens unit UI and the rear unit UII move axially for zooming, whereby the airspace A between the two lens units varies during zooming.

The focal length of the zoom lens comprising the second embodiment varies between 35 and 80 mm, the zoom lens has a semi-field angle (i.e., half angle) of 31.8 to 14.9 degrees and its F/# varies from F/8.5 to F/16.

Figure 3:
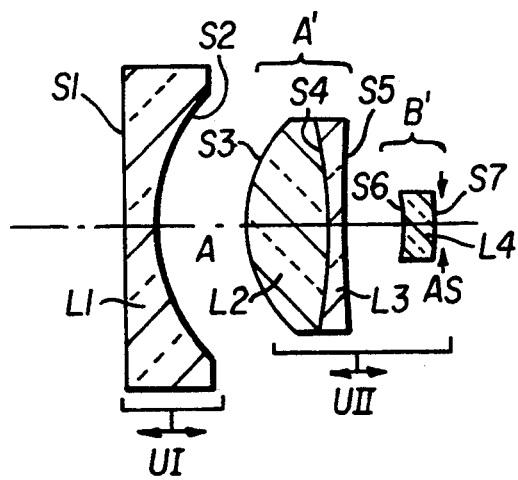
FIG. 3 is a sectional view of a third embodiment of the lens system according to the present Invention.

The third embodiment is illustrated in FIG. 3 and its parameters are given in Table 3. Its configuration is very similar to that of the second embodiment described above. However, one of the elements, and more specifically the rear most lens element L4, has an aspheric surface. The equation and parameters for that surface are also provided in Table 3. The focal length of the zoom lens of the fourth embodiment varies between about 35 and 80 mm. The zoom lens covers a semiangle of 32 to 14 degrees and the F/# varies between F/8.5 to F/16.

The invention has been described in detail with particular reference to certain preferred embodiments thereof, but it will be understood that variations and modifications can be effected with the spirit and scope of the invention as set forth in the claims. For example, such modifications could include, but not be limited to splitting of the power of a single lens element to create more lens elements, bending the weak surface S1 of the front lens element L1 to make this element bi-concave, an introduction of one or more aspheric surfaces or introduction of a lens element which does not materially affect the third order aberrations of the zoom lens system. Furthermore, the addition of planar transparent elements having no optical refracting power are not to be considered as lens elements, lens units, sub-units, lens components or lens groups as these terms are used herein. In addition, the lenses described herein may be used in other applications in addition to the described use as a taking lens for photographic cameras.

I claim:

1. A zoom lens comprising in order from the object side:
a front lens unit having a negative refractive power, said front lens unit being movable on an optical axis for zooming operation, said front lens unit comprising a negative lens element and including no positive lens elements; and
a rear lens unit having positive refractive power, said rear lens unit being movable on the optical axis for zooming operation, said rear lens unit comprising a plurality of optical elements arranged into two subunits, one of said subunits having positive optical power, the other of said subunits having negative optical power, said zoom lens having only two lens units.

2. A zoom lens comprising in order from the object side:
a front lens unit having a negative refractive power, said front lens unit being movable on an optical axis for zooming operation, said front lens unit consisting of a single negative element, and
a rear lens unit having positive refractive power and comprising only two subunits of optical elements, said rear lens unit being movable on an optical axis for zooming operation, said subunits, being a front subunit and a rear subunit, one of which subunits having positive optical power and one of which subunits having negative optical power, said zoom lens having only two lens units.

3. A zoom lens according to claim 2 wherein said front subunit has positive power and said rear subunit has negative optical power.

4. A zoom lens according to claim 2 and further comprising an aperture stop located adjacent said rear subunit.

5. A zoom lens according to claim 2 and further comprising an aperture stop located between said two subunits.

6. A zoom lens according to claim 2 and further comprising an aperture stop located behind said rear subunit.

7. A zoom lens according to claim 3 and further comprising an aperture stop located adjacent said rear subunit.

8. A zoom lens according to claim 3 and further comprising an aperture stop located between said two subunits.

9. A zoom lens according to claim 3 and further comprising an aperture stop located behind said rear subunit.

10. A zoom lens consisting, in order from the object side, of the following lens units in combination:
a front-most lens unit having a negative refractive power, said front lens unit being movable on an optical axis for zooming operation, said front lens unit consisting of a single negative lens component; and
a rear-most lens unit having positive refractive power, said rear lens unit movable on an optical axis for zooming operation, said rear-most lens unit consisting of two lens components, a front lens component and a rear lens component, at least one of which being of positive optical power.

11. A zoom lens according to claim 10 and in combination with an aperture stop, said aperture stop being located adjacent to said rear lens component.

12. A zoom lens according to claim 10 and in combination with an aperture stop located between said lens components of said rear-most lens units.

13. A zoom lens according to claim 10 wherein said front lens component is a cemented doublet.

14. A zoom lens according to claim 13 wherein said rear lens component is a meniscus lens component.

15. A zoom lens according to claim 10 wherein said rear lens component is a meniscus lens element.

16. A zoom lens according to claim 10 wherein said front lens component has positive power.

17. A zoom lens according to claim 10 wherein said rear lens component has negative power.

18. A zoom lens according to claim 14 wherein said rear lens component has negative power.

19. A zoom lens according to claim 16 wherein said rear lens component has negative power.

20. A zoom lens according to claim 10 wherein (a) said negative component of said front-most lens unit has a surface with a smaller radius of curvature facing said rear-most lens unit; (b) said front lens component of said rear-most lens unit having an external surface with a smaller radius of curvature facing said front-most lens unit; and (c) said rear lens component of said rear-most lens unit having a surface with a smaller radius of curvature facing said front lens component.

21. A zoom lens comprising in order from object side:
a frontmost lens unit having negative refractive power, said frontmost lens unit being movable on an optical axis for zooming operation, said frontmost lens unit having only a single negative lens element having a front surface and a rear surface, said rear surface having a shorter radius of curvature than said front surface; and a rearmost lens unit having positive refractive power, said rearmost lens unit being movable on an optical axis for zooming operation, said rearmost lens unit comprising a first lens component having positive power and a second lens component having negative power.

22. A zoom lens according to claim 21 wherein said first lens component of said rearmost lens unit is a singlet.

23. A zoom lens according to claim 21 wherein said first lens component of said rearmost lens unit is a cemented doublet.

24. A zoom lens according to claim 22 and further having the following parameters:

TABLE 1

| Surface | Clear Aper. | Radius | Thickness | Glass N | V |
|---|---|---|---|---|---|
| 1 | 27.50 | $r_1 = 234.733$ | $d_1 = 2.50$ | 1.501 | 56.4 |
| 2 | 22.58 | $r_2 = 18.202$ | $d_2 = A$ | | |
| 3 | 13.71 | $r_3 = 11.774$ | $d_3 = 3.87$ | 1.589 | 61.3 |
| 4 | 12.20 | $r_4 = 96.685$ | $d_4 = 7.74$ | | |
|  | 3.71 | DIAPHRAGM | | | |
| 5 | 3.67 | $r_5 = -11.609$ | $d_5 = 0.50$ | | |
| 6 | 4.10 | $r_6 = -14.870$ | $d_6 = 3.00$ | 1.805 | 25.4 |

| EF | BF | FF | A | LENS LENGTH | F/NO | DIAPH DIAM | BEST FOCUS |
|---|---|---|---|---|---|---|---|
| 69.99 | 62.72 | 58.58 | 4.491 | 22.101 | 16.0 | 3.71 | −1.67 |
| 47.00 | 46.59 | 25.82 | 12.082 | 29.692 | 12.1 | 3.71 | −1.30 |
| 35.01 | 38.17 | 8.73 | 20.000 | 37.610 | 10.0 | 3.71 | −0.70 |
| 79.98 | 69.73 | 72.82 | 2.553 | 20.163 | 17.7 | 3.71 | −1.77 | where the reference symbols $r_1, r_2, \ldots$ represent radii of curvature of the surfaces S1, S2 ... of the respective lens elements L1, L2, L3, L4. The reference symbols $d_1, d_2, \ldots$ designate thickness of the respective lens elements and air spaces reserved therebetween, the reference N is an index of refraction and symbol V represents Abbe numbers of the respective lens elements.

25. A zoom lens according to claim 23 and further having the following parameters:

TABLE 2

| Surface | Clear Aper. | Radius | Thickness | Glass N | V |
|---|---|---|---|---|---|
| 1 | 31.90 | $r_1 = 577.968$ | $d_1 = 3.000$ | 1.498 | 67.0 |
| 2 | 26.19 | $r_2 = 19.897$ | $d_2 = A$ | | |
| 3 | 19.97 | $r_3 = 14.684$ | $d_3 = 8.102$ | 1.772 | 49.7 |
| 4 | 16.79 | $r_4 = -49.920$ | $d_4 = 1.500$ | 1.847 | 23.8 |
| 5 | 14.75 | $r_5 = 127.413$ | $d_5 = 5.937$ | | |
| 6 | 5.54 | $r_6 = -13.821$ | $d_6 = 3.796$ | 1.847 | 23.8 |
| 7 | 4.06 | $r_7 = -19.858$ | $d_7 = 0.000$ | | |
|  | 3.96 | DIAPHRAGM | | | |

| FF | BF | FF | A | LENS LENGTH | F/NO | DIAPH DIAM | BEST FOCUS |
|---|---|---|---|---|---|---|---|
| 79.96 | 63.32 | 78.37 | 2.779 | 25.114 | 16.00 | 3.96 | −1.02 |
| 52.90 | 45.55 | 37.16 | 9.951 | 32.286 | 11.50 | 3.96 | −0.81 |
| 35.01 | 33.81 | 9.92 | 20.777 | 43.112 | 8.54 | 3.96 | −0.48 | where the reference symbols $r_1, r_2, \ldots$ represent radii of curvature of the surfaces S1, S2 ... of the respective lens elements L1, L2, L3, L4. The reference symbols $d_1, d_2, \ldots$ designate thickness of the respective lens elements and air spaces reserved therebetween, the reference N is an index of refraction and symbol V represents Abbe numbers of the respective lens elements.

26. A zoom lens according to claim 23 and further having the following parameters:

TABLE 3

| Surface | Clear Aper. | Radius | Thickness | Glass N | V |
|---|---|---|---|---|---|
| 1 | 21.10 | $r_1 = 2193.850$ | $d_1 = 3.000$ | 1.498 | 67.0 |
| 2 | 23.37 | $r_2 = 17.160$ | $d_2 = A$ | | |
| 3 | 18.72 | $r_3 = 12.950$ | $d_3 = 7.480$ | 1.772 | 49.7 |
| 4 | 15.91 | $r_4 = -51.994$ | $d_4 = 1.500$ | 1.847 | 23.8 |
| 5 | 13.71 | $r_5 = 77.152$ | $d_5 = 5.430$ | | |
| 6 | 5.33 | $r_6 = $ ASPHERE | $d_6 = 2.924$ | 1.847 | 23.8 |
| 7 | 4.16 | $r_7 = -17.606$ | $d_7 = 0.000$ | | |
|  | 4.05 | DIAPHRAGM | | | |

| EF | BF | FF | A | LENS LENGTH | F/NO | DIAPH DIAM | BEST FOCUS |
|---|---|---|---|---|---|---|---|
| 79.87 | 64.72 | 78.45 | 2.766 | 23.100 | 16.00 | 4.05 | −.31 |
| 52.93 | 46.02 | 39.62 | 8.072 | 28.406 | 11.40 | 4.05 | −.61 |
| 35.02 | 33.60 | 13.82 | 16.113 | 36.447 | 8.31 | 4.05 | −.46 |

$$X = \frac{CY^2}{1 + \sqrt{1 - (K + 1)C^2Y^2}} + DY^4 + EY^6$$

TABLE 3-continued $$C = -.07806828$$
$$K = .34475$$
$$D = -0.4711 \times 10^{-4}$$
$$E = -0.1009 \times 10^{-5}$$
$$\text{VERTEX RADIUS} = -12.8093$$

where the reference symbols $r_1, r_2, \ldots$ represent radii of curvature of the surfaces S1, S2 ... of the respective lens elements L1, L2, L3, L4. The reference symbols $d_1, d_2, \ldots$ designate thickness of the respective lens elements and air spaces reserved therebetween, the reference N is an index of refraction and symbol V represents Abbe numbers of the respective lens elements, 1/C is a radius of curvature for the surface and K is a conic constant of the surface, y is a marginal ray height and D and E are aspheric coefficients of the surface.

27. The zoom lens of claim 21 and wherein said zoom lens has only three lens elements.

28. The zoom lens of claim 21 and wherein said zoom lens has only four lens elements and two of said elements are in the form of a doublet.

29. The zoom lens of claim 27 and wherein the zoom ratio is at least 2.

30. The zoom lens of claim 28 and wherein the zoom ratio is at least 2.

31. A zoom lens comprising in order from object side:

a frontmost lens unit having negative refractive power, said frontmost lens unit being movable on an optical axis for zooming operation, said frontmost lens unit having only a single negative lens element having a front surface and a rear surface, said rear surface having a shorter radius of curvature than said front surface; and a rearmost lens unit having a positive refractive power, said rearmost lens unit being movable on an optical axis for zooming operations, said rearmost lens unit comprising a first lens component having positive power and a second lens component, said second lens component being a meniscus shaped lens element.

32. A zoom lens according to claim 31 wherein said first lens component of said rearmost lens unit is a singlet.

33. A zoom lens according to claim 31 wherein said first lens component of said rearmost lens unit is a cemented doublet.

* * * * *